Figure 2:
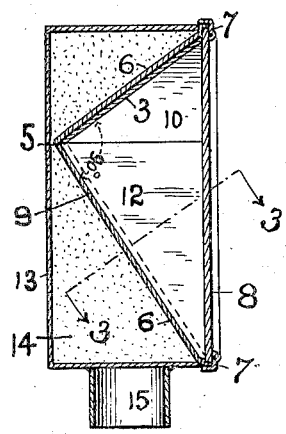

April 15, 1930. E. A. MILLER ET AL 1,754,899
DANGER SIGNAL DEVICE
Filed Oct 25, 1924 2 Sheets-Sheet 1

Inventors.
Edgar A. Miller
Cleveland A. James
By [signature]
Attorney.

April 15, 1930. E. A. MILLER ET AL 1,754,899
DANGER SIGNAL DEVICE
Filed Oct. 25, 1924 2 Sheets-Sheet 2
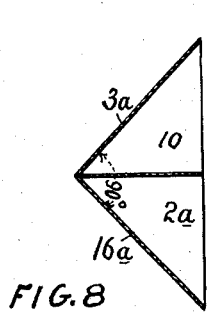
FIG. 8
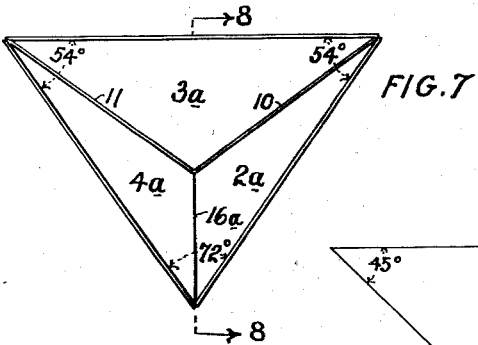
FIG. 7
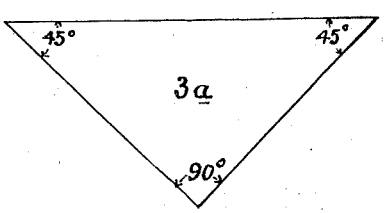
FIG. 10
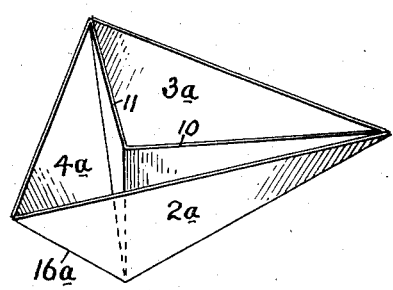
FIG. 9
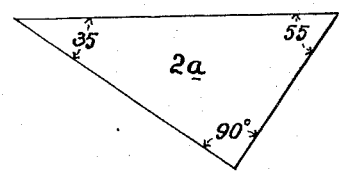
FIG. 10a
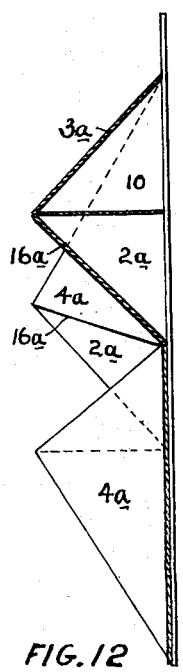
FIG. 12
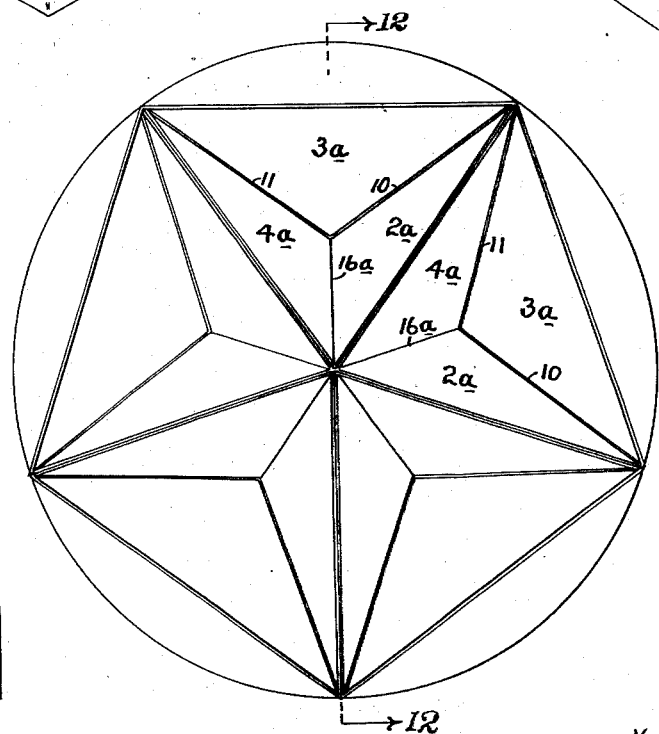
FIG. 11
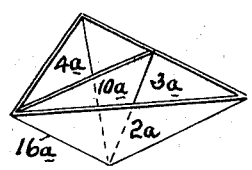
FIG. 13
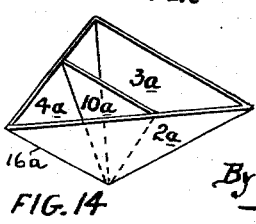
FIG. 14
Inventors
Edgar A. Miller
Cleveland A. James
By
Attorney.

Patented Apr. 15, 1930

1,754,899

UNITED STATES PATENT OFFICE

EDGAR A. MILLER AND CLEVELAND A. JAMES, OF PHILADELPHIA, PENNSYLVANIA

DANGER-SIGNAL DEVICE

Application filed October 25, 1924. Serial No. 745,752.

The object of the invention is to provide a construction of danger signal device, the luminosity of which is dependent upon the reflection of the light beams of approaching automobiles, such signals being arranged at dangerous cross roads and at curves, and so devised that the white beam is reflected back as a red or other colored beam denoting danger or caution.

In the simplest construction of our danger signal, we employ three reflector units of triangular form abutted together to provide three radial lines of union which not only are radial from the deepest portion or center of the reflector but incline upward and provide reflecting faces arranged in abutting relation and at an angle to each other when cut transversely by a plane at an angle to any one of the inclined radial lines of union, and with such a triangular reflector we combine one or more intermediate outwardly extending translucent colored ribs lying in a plane or planes corresponding to one or more of the radial lines of union, said ribs preferably triangular in surface shape, being deepest at their junction in the center of the reflector and tapering in height to approximately nothing at their outer ends.

Broadly, our invention comprises a reflector signal device having three triangular surfaces placed in abutted relation at right angles to one another and forming triangular reflecting depressions, combined with a rib or ribs interposed between two or more of the reflecting surfaces to color the reflected light; and more specifically, our invention consists of the associated relation of three right triangular reflecting surfaces placed with the vertices of the three right angles together and with the sides of the reflectors abutting so that the hypohenuses form a triangle, combined with a rib or ribs, placed in the depressed space between the reflecting surfaces so as to color the reflected light.

Our invention further comprises a danger signal of the foregoing described features further associated with a mechanically shaped backing frame of metal or other material, of shape to receive the reflectors and translucent colored ribs and properly position them, whereby rapid and accurate assembling of the parts into a composite whole may be accomplished.

Our invention consists further in a plurality of composite signal devices of the character above specified when arranged about a central point, employing preferably five of the devices in substantially circular arrangement and presenting the reflecting surfaces and radial ribs in a large number of different angles or positions which greatly increase the reflecting power as well as the area of the colored reflected beam. By varying the size of the composite reflecting units, the circular arrangement may be made of any size desired.

Figure 1:
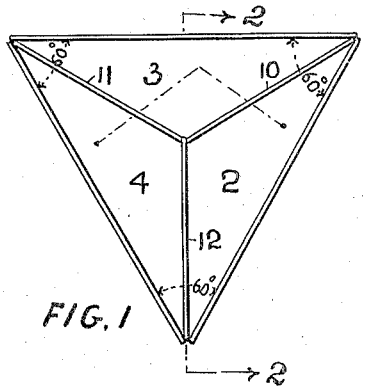
Figure 3:
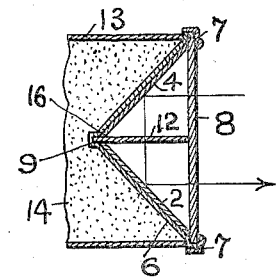
Figure 4:
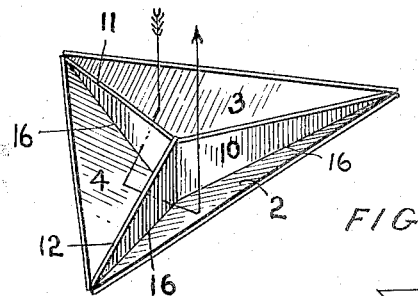
Figure 5:
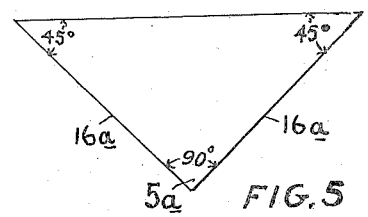
Figure 6:
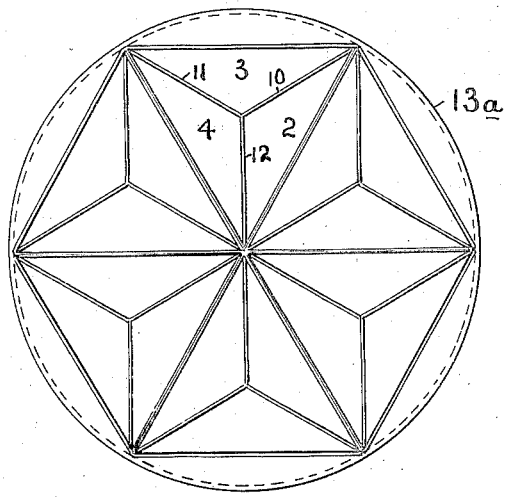

Our invention will be better understood by reference to the drawings in which: Fig. 1 is a front view of one of the reflecting composite units; Fig. 2 is a vertical section of same taken on line 2—2, associated with casing and backing; Fig. 3 is a transverse section of same taken on line 3—3; Fig. 4 is a perspective view of the device shown in Fig. 1; Fig. 5 is a face view of one of the reflectors; Fig. 6 is a front view when six of the composite units are arranged side by side in the form of a circle to make a large reflector and danger signal; Fig. 7 is a front view corresponding to Fig. 1, but having the triangular reflectors of somewhat different shape; Fig. 8 is a vertical section taken on line 8—8 of Fig. 7; Fig. 9 is a perspective view of the reflector device of Fig. 7; Fig. 10 is a face view of one of the reflectors shown in Fig. 7; Fig. 10ª is a similar view of the remaining two reflectors shown in Fig. 7; Fig. 11 is a front view of a danger signal when five of the reflector units of Figs. 7 and 9 are employed in circular arrangement; Fig. 12 is a section of same on line 12—12; and Figs. 13 and 14 are perspective views of modified constructions.

Considering first the reflector and translucent ribs of Figs. 1, 3 and 5, we employ three reflectors 2, 3 and 4 of the same triangular shape so that when associated as shown, the boundary is an equilateral triangle. The aggregate of the angles 5ª (Fig. 5) formed by the approaching edges 16ª, of the three reflecting surfaces, is greater than 120 degrees and, therefore, the assembling of these three reflectors will provide a depressed reflector of general triangular form and with inclined triangular reflecting surfaces. The lines of junction 16 are radial from the center and incline upward to the points of the triangle at its front portion where it is covered by the glass-plate 8, as shown in Fig. 2. Translucent colored ribs 10, 11 and 12, of triangular shape, are arranged with their deepest ends in abutted relation at the center or apex of the associated reflectors, being positioned in radial directions immediately over the associated or abutted edges of the reflectors at 16 (Fig. 4). In practice, we prefer to make these ribs red in color as indicative of danger, but they may be made of a green color where caution alone is to be indicated. These ribs must be translucent so as to permit the light rays to pass through them and to illuminate them whereby the color embodied in them will be impressed upon the return light rays or beam.

The shape of the triangular reflectors 2, 3 and 4 should be such that when assembled as shown, a plane at right angles to either of the junction lines 16 will cut the planes so that their reflecting surfaces will be at right angles to each other, as indicated in the line 3—3 of Fig. 2, and as fully shown in Fig. 3, which is a section taken on that line. This enables the direct rays to be reflected straight back to the automobile from whence they came, but with color imparted to them since they have passed through the colored ribs 10, 11 and 12 before final reflection. The general effect is not to observe the colored beam of light as such, but to see the color in the signal device itself and conceive of it as a self-energized danger signal suddenly brought into view.

The reflectors and colored ribs may be secured in permanent relation in any suitable manner and as a convenient way of accomplishing this we prefer to provide a suitable backing frame 6 of stamped sheet metal or other material having radial grooves 9 in which the colored ribs 10, 11 and 12 are inserted and by which they are definitely positioned. The reflecting plates 2, 3 and 4 rest obliquely upon the backing frame 6 and between the ribs. An outer casing 13 surrounds the reflectors and backing frame and preferably with a plaster or other filling 14 to give rigidity. A front plate 8 of clear glass is held in position by a metal rim 7 and acts to retain the reflectors and ribs in position upon the backing frame 6. A socket 15 may be provided for attaching the signal device upon a post.

In the construction shown in Fig. 6, we have employed six of the devices shown in Figs. 1 and 4, arranged about a center for increasing the area and the amount of reflected colored light. These units of Figs 1 and 4, as shown or in modified form, may be arranged in any other suitable way desired.

We have described our invention in the form wherein the reflecting surfaces are triangular and of such shape that when associated in assembled relation, the general boundary or perimeter is an equilateral triangle, but experience has shown that the best results (greatest area of reflector surfaces giving colored reflection of light when in action) are obtained when the triangular unit has such shape that five of them arranged about a center form a circular reflector, as shown in Fig. 11, the detail construction of which will now be described.

Considering Figs. 7 and 8, the triangular reflecting surfaces $2^a$, $3^a$ and $4^a$ are not of the same area, as in the case of the surfaces 2, 3 and 4 of Fig. 1, but, on the contrary, the shape of surface $3^a$ is a right angled triangular surface whose other angles are 45 degrees or thereabout, and the shapes of surfaces $2^a$ and $4^a$ are right angled triangles in which all sides are unequal (Fig. $10^a$). The result of the assemblage of two of the reflecting surfaces (right and left) shown in Fig. $10^a$ with the triangular reflecting surface shown in Fig. 10 to form the composite reflector of Figs. 7, 8 and 9, provides a general triangular shape having one angle 72 degrees and the other two angles of 54 degrees each. Further, the angle formed on the section line 8—8 is a right angle wherein the junction line $16^a$ is equal in length to the sectional width of the reflector $3^a$ instead of being approximately twice that length, as in Fig. 2. Furthermore, the angles of the said parts with the plane of the back are each 45 degrees, instead of 30 and 60 degrees, as in Fig. 2. The result of this difference insures, in the case of Figs. 7, 8 and 9, a return reflection from the entire surfaces even to the 72 degrees angle, whereas, in the structure of Figs. 1 to 4, the return reflection does not reach the corresponding angle and to this extent fail to return a reflected colored signal, a difference which is more fully apparent when comparing the results of the two structures Figs. 6 and 11.

In respect to the utilization of the colored ribs, we have shown in Figs. 7, 8, 9, 10 and 12 the use of two ribs 10 and 11 corresponding to those employed in the case of Figs. 1 to 6 inclusive, but have omitted the rib 12, because the shape of the reflectors in this case are such that all of the reflected light will pass through the colored ribs 10 and 11, and hence the rib 12 is not required. If desired, the rib 12 may be employed, but in that event, either rib 10 or 11 may be omitted. Furthermore, in the modifications shown in Figs. 13 and 14, it will be seen that the rib structure $10^a$ is triangular in shape and corresponds to either of the ribs 10, 11 or 12 when extended in a straight line across the reflecting surface beyond the vertex or lowermost point in the triangular association. Similarly, in Fig. 14, the rib is triangular and arranged from the vertex upwardly between two of the reflecting surfaces and parallel to the outer edge of the remaining reflecting surface such as 3ª. In either of these cases, the reflecting beam of light will pass through the colored rib before being reflected back to the source. In either of the constructions shown in Figs. 7, 13 and 14, the light will be reflected from all three surfaces and will only pass through the colored ribs once, whereas if three colored ribs are employed, as in Fig. 1, the reflected light will be required to pass through the colored ribs 5 and will, therefore, be diminished in brilliancy. As the light strikes the three reflecting surfaces before it is reflected back, any position of a rib that will catch the light from all three surfaces will operate successfully, and we, therefore, do not limit ourselves to the exact arrangements of the ribs, as shown in the drawings.

Fig. 11 shows an assemblage of five of the reflector units illustrated in Figs. 7, 8 and 9, and from the description and explanation, it will be manifest that the reflected colored light in this case will be emitted from practically all of the reflector surfaces right up to the center, and hence give better results with a smaller area than in the case shown in Fig. 6. It is equally evident that if the general construction of Fig. 11 is formed with the reflector units of Figs. 13 and 14, the same general advantage will be secured, as the only differences would be in the colored ribs and as we have explained, these may be varied without modifying the general principles and results.

Broadly, our invention may be considered as comprising a composite reflector having three triangular reflecting surfaces forming a depressed reflector and in which there is a radial rib through which the light passes in being reflected from one surface to the other and prior to its return to the source of light, but in practice, we prefer that the specific construction embodied in Figs. 7 to 14 shall be employed in preference to the construction shown in Figs. 1 to 6, inclusive.

The radial translucent colored ribs 10, 11 and 12 may be made of glass, celluloid or other suitable material and we do not restrict ourselves in this respect. Also, the reflecting parts 2, 3 and 4 may best be made of glass with silvered reflecting surfaces and it will be manifest that when so made the glass may be molded, or rolled, or otherwise shaped as found most convenient, so long as the reflector surfaces are effective in action upon the light rays. It will also be understood that while we prefer glass as the carrier of the reflecting surfaces, the reflectors may be of sheet metal with highly polished surfaces, if so desired.

We have shown our signal device in the most compact form and have specifically provided triangular reflecting surfaces, but it is to be kept in mind that the exact shape of the perimeters of the reflectors are secondary to the essential feature embodying the angularity which the three or more reflecting surfaces make with each other and the correlation therewith of the colored rib or ribs.

It will now be apparent that we have devised a novel and useful construction which embodies the features of advantage enumerated as desirable, and while we have in the present instance shown and described the preferred embodiment thereof which has been found in practice to give satisfactory and reliable results, it is to be understood that we do not restrict ourselves to the details, as the same are susceptible of modification in various particulars without departing from the spirit or scope of the invention.

Having now described our invention, what we claim as new and desire to secure by Letters Patent is:

1. A reflector signal device consisting of five reflecting units arranged about a common center to form a substantially continuous reflecting means, each unit comprising three reflecting surfaces each having two edges respectively in juxtaposition with an edge of each of the other two surfaces and each reflecting surface having a right angle between its said edges whereby when the surfaces are relatively positioned they form a triangular depression, one of said surfaces having equal sides on each side of a 90° corner angle and the remaining surfaces having unequal sides on each side of a 90° corner angle.

2. A reflector signal device having a plurality of reflecting units in associated relation, each unit comprising three reflecting surfaces each having a triangular shape one of which surfaces has equal sides on each side of a 90° corner angle and the remaining surfaces have unequal sides on the respective sides of a 90° corner angle, said reflecting surfaces of each unit arranged at an angle to each other and each having two edges respectively in juxaposition with one of the edges of each of the other two reflecting surfaces, and each unit having a colored means through which the light beams are caused to pass to impart color to the reflected light, the said plurality of units being arranged side by side in a circle and secured together in fixed relation with radial abutting edges, whereby the number of oblique reflecting surfaces are correspondingly increased and the area of the colored reflection greatly enlarged.

3. A reflector device consisting of an uneven number of reflecting units arranged about a common center to form a substantially continuous annular reflecting means, each unit comprising three triangular reflecting surfaces abutting each other to form a triple reflector and whose axis is nearer to the common center than is a central point in the orifice of the triple reflector.

In testimony of which invention, we hereunto set our hands.

EDGAR A. MILLER.
CLEVELAND A. JAMES.